(12) United States Patent
Fujii et al.

(10) Patent No.: US 6,611,299 B1
(45) Date of Patent: Aug. 26, 2003

(54) LIQUID CRYSTAL DISPLAY APPARATUS WITH TOUCH-PANEL, AND TOUCH-PANEL

(75) Inventors: Sadao Fujii, Kobe (JP); Keizo Asaoka, Otsu (JP); Toshihiko Hikida, Settsu (JP)

(73) Assignee: Kaneka Corporation (JP)

( * ) Notice: Subject to any disclaimer, the term of this patent is extended or adjusted under 35 U.S.C. 154(b) by 0 days.

(21) Appl. No.: 09/536,896

(22) Filed: Mar. 28, 2000

Related U.S. Application Data (63) Continuation of application No. PCT/JP99/04184, filed on Aug. 3, 1999.

(30) Foreign Application Priority Data

Aug. 4, 1998 (JP) .......................................... 10-220342
Jan. 14, 1999 (JP) .......................................... 11-007819

(51) Int. Cl.[7] .......................... G02F 1/1335; G02G 5/00
(52) U.S. Cl. ........................ 349/12; 349/117; 345/173
(58) Field of Search .......................... 349/12, 117, 118; 345/173

(56) References Cited

U.S. PATENT DOCUMENTS 3,900,248 A    8/1975  Nagasaki .................... 350/160
5,237,438 A    8/1993  Miyashita et al.
5,472,635 A   12/1995  Iida et al. ............... 252/299.01
6,020,945 A    2/2000  Sawai et al.
6,204,904 B1   3/2001  Tillin et al. .................. 349/119

FOREIGN PATENT DOCUMENTS

| JP | 05127822 | 5/1993 |
| JP | 05-157911 | 6/1993 |
| JP | 10-048625 | 2/1998 |
| JP | 10186136 | 7/1998 |
| JP | 10-186136 | 7/1998 |
| JP | 10-090521 | 10/1998 |

*Primary Examiner*—Robert H. Kim
*Assistant Examiner*—Dung Nguyen
(74) *Attorney, Agent, or Firm*—Christensen O'Connor Johnson Kindness PLLC (57) ABSTRACT

The touch-panel equipped liquid crystal display apparatus has a polarizing plate, a ¼ wave plate, a touch panel, a ¼ wave plate, and a liquid crystal cell, which are disposed in the above-mentioned order from the display surface side. The arrangement is made such that the polarization axis of the polarizing plate and the slow axis within the film surface of the ¼ wave plate make an angle of 45° substantially, and the slow axis within the film surface of the ¼ wave plate and the polarization axis of the emission light from the liquid crystal cell make an angle of 45° substantially. Further, the slow axes of the ¼ wave plates and are arranged not in parallel with each other, or not cross over at right angles.

9 Claims, 3 Drawing Sheets

LIQUID CRYSTAL DISPLAY APPARATUS WITH TOUCH-PANEL, AND TOUCH-PANEL

CROSS-REFERENCE TO RELATED APPLICATIONS

This is a continuation of Application No. PCT/JP99/04184, filed Aug. 3, 1999.

This application is based upon and claims the benefit of priority from the prior Japanese Patent Applications No. 10-220342, filed Aug. 4, 1998; and No. 11-007819, filed Jan. 14, 1999, the entire contents of which are incorporated herein by reference.

BACKGROUND OF THE INVENTION

The present invention relates to a liquid crystal display apparatus equipped with a transparent touch panel capable of preventing a decrease in the visibility, which is caused by the reflection of external light, when it is mounted on liquid crystal cell, and to a touch panel used in the apparatus.

Recently, an attention is focused on the liquid crystal display element as an image display element, and it is expected the liquid crystal display apparatus is applied to a portable electronic databook, data terminal, the view finder of a video camera, the monitor of a car navigator, as a kind of its usage. These days, there is a demand of an input method, in which a transparent touch panel is placed on the display element of each of these devices as an input device, and an input can be made while monitoring the screen. Conventionally, in such usage, a so-called resistance-film type touch panel, which is a touch panel manufactured with use of polyethylene terephthalate (PET) film having a transparent conductive film thereon and glass having a transparent conductive film thereon, is stacked on a liquid crystal display element to be used.

Meanwhile, as the usage of the touch panel widens, there are demands created, such as the improvement of the contrast of the display and the prevention of the reflection of external light, and therefore a technique of integrating a touch panel and a liquid crystal display apparatus together is attempted. Such a technique is, as described in Jpn. Pat. Appln. KOKAI Publication No. 10-48625, a liquid crystal display apparatus, in which a touch panel is provided between a display surface-side polarizing plate and cell having a liquid crystal material sealed between transparent electrode substrates (to be called as liquid crystal cell hereinafter), and further a retardation corresponding to a ¼ wavelength to visible light is imparted to the transparent conductive substrate constituting a touch panel, or corresponding ¼ wave plates are adhered together, so as to build a touch panel therein, thus preventing internal reflection light. In particular, from the display surface side, a polarizing plate, a ¼ wave plate A, a touch panel, a ¼ wave plate B and a liquid crystal cell are arranged in the order, and further slow axes of the ¼ wave plates A and B are arranged to be in parallel or perpendicular with each other, so as to prevent the return of light to the display surface due to the reflection of external light by the ¼ wave plate A. Further, undesirable coloring on the display and a decrease in contrast, which are caused by the ¼ wave plate A, can be prevented by the ¼ wave plate B.

Figure 1:
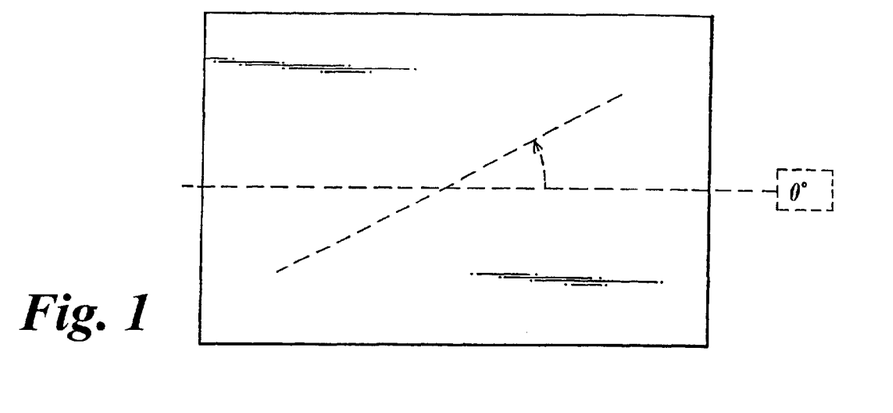
FIG. 1 is a view showing an axial angle display method in the present invention.

In the case of the above-described structure, it is necessary that the polarization light axis of polarized light emitted from the liquid crystal cell in the cases where a voltage is applied to liquid crystal and where it is not, the polarization axis of the display surface-side polarizing plate, and slow axes of the ¼ wave plates A and B within a film surface, satisfy such a relationship that a diagonal position, that is, the difference in axial angle between the polarization axis and the slow axis of the ¼ wave plate, becomes 45°. In the case of liquid crystal display apparatus of an ordinary twist nematic type, a typical example of which is a thin-film transistor liquid crystal display device (TFT), the polarization axis of emitted light from a liquid crystal cell while a voltage is applied or not applied to the cell makes 45° or 135° in many cases, and similarly, the polarization axis of the polarizing plate on the display surface side makes 45° or 135°. (Note that the absolute angle of each axis is set to 0° in the horizontal direction as viewed from the display surface side, and it increase positively in the counter-clockwise direction, as shown in FIG. 1.) Therefore, the slow axis of the ¼ wave plate is arranged towards the 0° or 90° direction.

In the meantime, the ¼ wave plate industrially produced, a typical example of which is a retardation film, is prepared by cutting a continuous roll-shaped retardation film of 100 m or more, into necessary sizes, and the slow axis is directed in the long side direction of the roll-shaped film (the machine length direction, to be called MD direction, hereinafter), or in the width direction of film (to be called TD direction). Therefore, the roll-shaped retardation film can be cut into display sizes at high yield by matching the display surface side direction with the MD or TD direction.

In the case of a liquid crystal display apparatus which does not have the above-described structure, that is, for example, in the case of a liquid crystal display apparatus such as of a special TN type, or an STN type having a super-twist nematic structure, the polarization axis of the emission light from the liquid crystal cell does not make 45° or 135° as in the former TN type, or in many cases, the polarization axis differs depending on the transmission wavelength. Therefore, it is necessary to arrange the slow axes of ¼ wave plates A and B to be inclined in accordance with the emission light polarization axis, in order to reduce the reflection light and minimize the change in color tone. Thus, it is necessary to cut the ¼ wave plate at an angle with respect to the TD direction of the roll-shaped retardation film, which causes a remarkable reduction of the yield.

Usually, as the surface side substrate of the touch panel, a thin glass plate or plastic film optically isotropic, which has a transparent conductive layer, is used. However, in the case of the plastic film, it generally has a low retardation of about 5 to 20 nm, and its slow axis is directed to the MD or TD direction. Therefore, as can be seen in Jpn. Pat. Appln. KOKAI Publication No. 10-186136, there has been a proposal that its slow axis is arranged to be parallel with the slow axis of the ¼ wave plate A so as to adjust the sum of the retardation values of both. Here, in the case where the slow axis of the ¼ wave plate is arranged to be inclined as described above, the plastic film having a transparent conductive layer should necessarily be cut and arranged inclined to be along the ¼ wave plate. Therefore, not only the ¼ retardation film, but also the film having the transparent conductive layer will have a remarkable decrease in the yield.

Further, there is an attempt that a ¼ wave plate is cut out from the roll-shape retardation film on which a touch panel transparent electrode is formed, and the ¼ wave plate and the electrode substrate are integrated with each other with such a structure, the layer structure on the touch panel display surface side (input surface side) becomes simple, and therefore the tool force necessary for input becomes simple. It is, further, advantageous that the production cost is lowered. However, as already described, the attempt entails a problem that the yield significantly decreases due to the fact that the layer need be cut to be inclined with respect to the film TD direction. Further, the film includes the roll-shaped retardation film which has been subjected to the secondary process including the transparent conductive process, which is an expensive film, and therefore the production cost will be markedly increased.

BRIEF SUMMARY OF THE INVENTION

In order to solve the above-described problem, the inventors of the present invention made intensive studies, and found that with newly use of a ½ wave plate having a retardation of ½ wavelength with respect to visible light, the slow axes within the film surfaces of ¼ wave plates A and B can be arranged substantially in a direction of 0° or 90° without deteriorating the optical characteristics, which has matured into the present invention.

Further, they found that the slow axis within the film surface of the ¼ wave plate A can be arranged substantially in a direction of 0° or 90° without deteriorating the optical characteristics, and thus the yield can be improved, by the relative angle between the two ¼ wave plate delay axes is shifted from vertical crossing or running in parallel with each other while the relative arrangements with respect to the polarization axis angle of emitted light from the polarizing plate and liquid crystal cell.

Thus, according to the first aspect of the present invention, there is provided a touch-panel equipped liquid crystal display apparatus comprising: a polarizing plate A; a ¼ wave plate A; a touch panel; a ¼ wave plate B; and a liquid crystal cell, which are disposed in the above-mentioned order from the display surface side, characterized in that at least one ½ wave plate C is arranged at a position between the display surface side polarizing plate A and the liquid crystal cell, and the slow axis within the film surface of the ¼ wave plate A is set substantially in a direction of 0° or 90°.

Further, according to the second aspect of the present invention, there is provided a touch-panel equipped liquid crystal display apparatus according to the first aspect, wherein the ¼ wave plates A and B, the ½ wave plate C and the touch panel are laminated into an integral body, and the ¼ wave plate A is laminated on the display surface side of the touch panel, whereas the ¼ wave plate B and the ½ wave plate C are laminated on the opposite side surface of the touch panel.

According to the third aspect of the present invention, there is provided a touch-panel equipped liquid crystal display apparatus comprising: a polarizing plate A; a ¼ wave plate A; a touch panel; a ¼ wave plate B; and a liquid crystal cell, which are disposed in the above-mentioned order from the display surface side, characterized in that the slow axis within the film surface of the ¼ wave plate A is set substantially in a direction of 0° or 90°, the slow axis within the film surface of the ¼ wave plate B is set substantially at a diagonal position to the direction of the polarization axis direction of the emitted light from the liquid crystal cell, and the slow axes of the ¼ wave plates A and B are arranged not in parallel with each other, or not cross over at right angles.

Further, according to the fourth aspect of the present invention, there is provided a touch-panel equipped liquid crystal display apparatus according to the third aspect, wherein the ¼ wave plates A and B, and the touch panel are laminated into an integral body, and the ¼ wave plate A is laminated on the display surface side of the touch panel, whereas the ¼ wave plate B is laminated on the opposite side surface of the touch panel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

For the liquid crystal display apparatus according to the first aspect of the present invention, a known liquid crystal display apparatus such as of a twist nematic (TN) type or a super-twist nematic (STN) type can be used.

As a wave plate usable for the present invention, a retardation film made of a known transparent plastic can be used. More specifically, plastic films of polycarbonate type, polyarylate type, polysulfone type, polyethersulfone type, poly(vinyl chloride) type, polyacrylonitryl type, polystyrene type, polypropylene type, polyolefine type such as olefin-maleimide copolymer-based resin, polyvinyl alcohol type, cellulose acetate type, substituted norbornene type, and the like, can be preferably used. Examples of particularly preferable materials are plastics of polycarbonate-based, polyester carbonate-based and polyarylate-based, which are made of bisphenol having an alkylidene group, such as bisphenol A as a bisphenol component, and bisphenol having a substituted or nonsubstituted cycloalkyldene. Further, polysulfone, polyethersulfone, norbornene-based resin disclosed in Jpn. Pat. Appln. KOKAI Publication No. 07-287122, and isobutylene-maleimide-based resin disclosed in Jpn. Pat. Appln. KOKAI Publication No. 05-59193, can be preferably used. Especially preferable films are of polyarylate, polycarbonate and polyestercarbonate, which contain a bisphenol component having a substituted or non-substituted cycloalkylidene group, an alkylidene group having 5 or more carbons or an aromatic group. More specifically, examples thereof are polycarbonates, polyarylate and polyester carbonate containing, as a bisphenol component, 1,1-bis(4-hydroxyphenyl)-cyclohexane, 1,1-bis(4-hydroxyphenyl)-3,3,5-trimethylcyclohexane, 3,3-bis(4-hydroxyphenyl)-pentane, 4,4-bis(4-hydroxyphenyl)-heptane, 1,1-bis(4-hydroxyphenyl)-1-phenylethane. The wave plate used in the present invention is not limited to these plastics, but all of the known wave plates can be used. In general, the heat resistance of these plastics should preferably be 80° C. or higher in terms of glass transition temperature, more preferably be 120° C. or higher, and even further more preferably be 160° C. or more.

The film which constitutes the wave plate regarding the present invention can be made by a known film formation method such as a molten extrusion method or a solution flow casting method. The solution flow casting method is more preferable forming method since films having a smooth surface property, a small dispersion in thickness as well as in retardation. With the solution flow casting method, it is possible to obtain a film having a surface roughness (Ra value) of 100 nm or less, and a thickness dispersion of 5% or less of the average film thickness.

It is preferable, regarding the ¼ wave plates A and B of the present invention, that the retardation value (Re) expressed by $(nx-ny) \times d$ is ¼ wavelength with respect to visible light wavelength, where nx represents the refractive index within the film surface in the slow axial direction, ny represents the refractive index in a direction perpendicular to the slow axial direction, nz represents the refractive index in the film thickness direction, and d represents the thickness of the film, and the retardation values of both wave plates should substantially be the same. A preferable retardation value is 90 nm to 200 nm, and more preferably, 110 nm to 160 nm.

In the meantime, the retardation value of the ½ wave plate C is 150 nm to 350 nm, preferably be 230 nm to 320 nm, and particularly preferably be 250 nm to 300 nm.

For the object of the present invention, each of the wave plates should preferably be ¼ or ½ wavelength over all wavelengths of visible light, and further it is preferable that a material with a retardation value of a wave plate, which has a small measurement wavelength dependency, should be selected. In particular, the material should preferably be of a type having a retardation with respect to light of a wavelength of 400 nm is 0.7 times or more but 1.2 times or less with respect to light of a wavelength of 550 nm. As preferable plastics, wave plates made of, other than polyvinyl alcohol or cellulose acetate, olefin-based plastics such as norbornene-based resin and isobutylene-maleimide-based resin, are preferable. Further, as can be seen in Jpn. Pat. Appln. KOKAI Publications No. 2-285304, No. 5-100114, No. 10-68816 and No. 10-90521, a lamination-type wave plate in which a plurality of retardation films are laminated such that the slow axes are displaced from each other, may be used.

Further, it is preferable that the retardations of these wavelengths should be as constant as possible also with respect to light made incident at angle. It is preferable that wave plates which satisfy nz>ny, such as disclosed in Jpn. Pat. Appln. KOKAI Publications No. 2-160204, No. 4-230704 and No. 5-157911, should be used. In the wave plates which satisfy nz>ny, the preferable relationship among nx, ny and nz varies depending upon optical properties of each wave plate, and relative positions with regard to liquid crystal cell and touch panel, and therefore the relationship need be determined by experience.

The liquid crystal display apparatus according to the present invention has such a structure that a polarizing plate A, a ¼ wave plate A, a touch panel, a ¼ wave plate B, and a liquid crystal cell are disposed in the above-mentioned order from the display surface side, and the slow axis within the film surface of the ¼ wave plate A is set substantially in a direction of 0° or 90° and the ½ wave plate C is arranged at an appropriate position between the polarizing plate A and the liquid crystal cell.

The preferable position of the ½ wave plate C is between the ¼ wave plate B and the liquid crystal cell. In the case where the liquid crystal display apparatus has a retardation film for color compensation between the liquid crystal cell and the display surface side polarizing plate A, it is preferable that the retardation film for color compensation should be arranged between the ½ wave plate C and the liquid crystal cell. Further, a now ½ wave plate D is arranged between the display surface side polarizing plate A and the ¼ wave plate A such that the slow axis within the film crosses over with the ¼ wave plate C at right angles, and in this manner, it becomes possible to prevent undesirable coloring on a display or a decrease in contrast, which is caused by the ½ wave plate C. In this case, the preferable polarization axial direction of the polarizing plate A is influenced, and therefore the arrangement must be optimized.

With reference to drawings, the touch panel-equipped liquid crystal display apparatus according to the first aspect of the present invention will now be described in detail.

Figure 2:
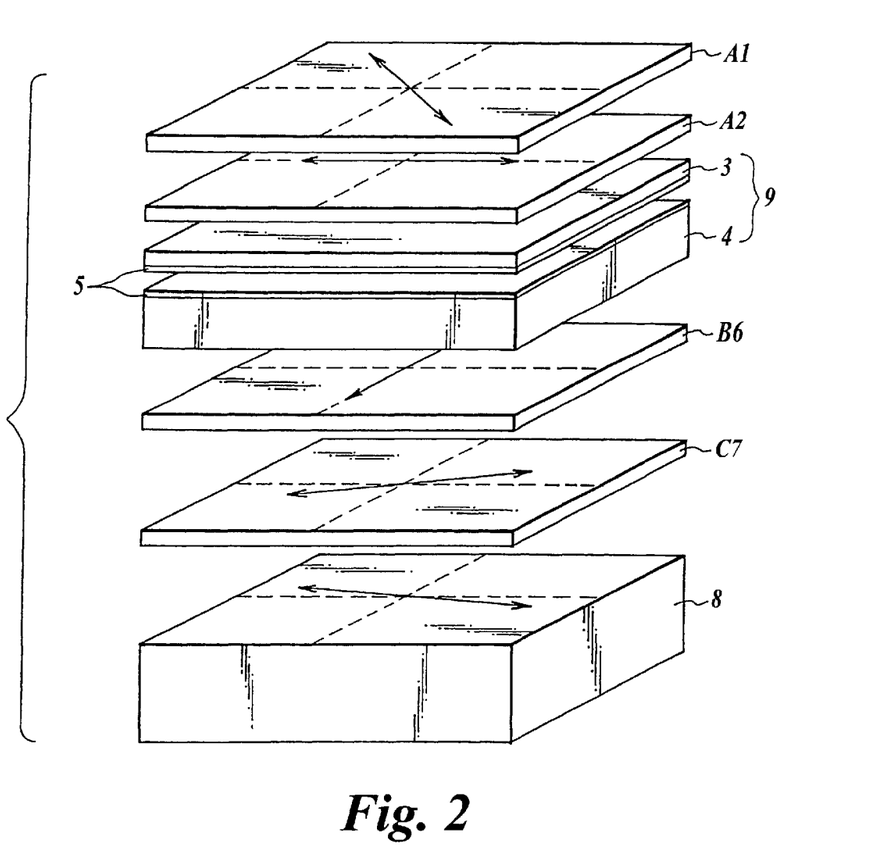
FIG. 2 is a view showing an example of the touch-panel equipped liquid crystal display device according to the first aspect of the present invention.

A specific embodiment of the present invention is shown in FIG. 2 together with the illustration of the arrangements of axes. From the display surface side, a polarizing plate A1, a ¼ wave plate A2, a touch panel 9, a ¼ wave plate B6 and a liquid crystal cell 8 are disposed in the above-mentioned order.

Figure 3:
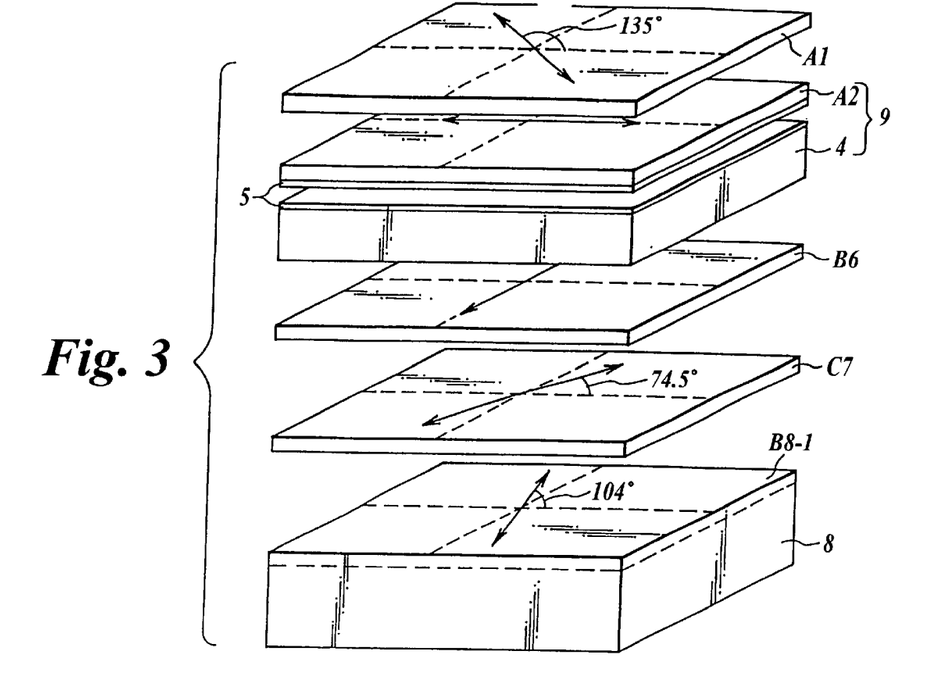
FIG. 3 is a view showing another example of the touch-panel equipped liquid crystal display device according to the first aspect of the present invention.

A resistance film type touch panel 9 of the present invention is a touch panel of a type in which two transparent conductive substrates on at least one surface of which a transparent conductive film is formed, are arranged such that the transparent conductive films face each other, and the transparent conductive substrate on the display surface side is pressed to bring the two conductive substrates into contact with each other, thus detecting the position. More specifically, the first transparent conductive substrate 3 and the second transparent conductive substrate 4 are formed as a combination such that the transparent conductive films 5 face each other. Spacers, electrodes and insulation resin and the like are formed on the two transparent conductive substrates 3 and 4 to have functions of touch panel. As the first transparent conductive substrate 3, a type which a transparent conductive layer is formed on an optically isotropic film can be used. Further, the first transparent conductive substrate 3 may be combined with the ¼ wave plate A, and as shown in FIG. 3, it is particularly preferable that the resultant of forming a transparent conductive film on the ¼ wave plate A, should be used as the first transparent conductive substrate. Here, the MD direction of the film can be made to match the display surface longitudinal side direction, and therefore the dispersion of the transparent conductive film resistance can be kept small, which is desirable. With such a structure, the film thickness on the touch panel display surface side (input surface side) can be reduced, thus making it possible to keep the pressure required for input by touch low. Thus, the input operation becomes easy, which is advantageous. The second transparent conductive substrate 4 is made of an optically isotropic material, generally, that in which a transparent conductive film is formed on a glass substrate, but it may be an optically isotropic plastic film or sheet. The second transparent conductive substrate 4 may be used while sticking it to the ¼ wave plate B, or of a type in which a transparent conductive film is formed directly on the ¼ wave plate B. The resistance values of these transparent conductive films should preferably be from 100 Ω/☐ to 1000 Ω/☐, more preferably 150 Ω/☐ to 500 Ω/☐.

In the case where the first transparent conductive substrate 3 or the second transparent conductive substrate 4 are formed of an optically isotropic plastic film or sheet, the film or sheet generally has a slight retardation of about 5 to 20 nm, and the slow axis is directed in the MD or TD direction. In such a case, the slow axis of the film or sheet is arranged to be in parallel with or at right angles to the slow axes of the ¼ wave plate A and the ¼ wave plate B, and in this manner, adverse effects on the display characteristics can be prevented.

The ½ wave plate C7 is usually arranged between the ¼ wave plate B and the liquid crystal cell. The preferable slow axial angle of the ½ wave plate C depends upon the polarization state of light emitted from the liquid crystal cell employed, and is set such as to obtain the most preferable display image.

In the case of an STN liquid crystal display device, the variation of the polarization state is complex since the birefringent effect is utilized. Generally, in the case of the STN liquid crystal display apparatus, a retardation film for color compensation is used to control the polarization state. In the case of a liquid crystal display in which a retardation film for color compensation is present on the display surface side of the liquid crystal cell, the liquid crystal cell of the present invention contains a retardation film for color compensation. Therefore, the ¼ wave plates A and B, the touch panel and the ½ wave plate are placed between the polarizing plate A and the retardation film for color compensation.

A liquid crystal cell is optically designed so that the emission light from the liquid crystal cell (in the case where a retardation film for color compensation is present, the light is emitted via the retardation film) maintains a linear polarization state. In particular, the emission light from the liquid crystal cell to which a voltage is not applied does not depend very much on the wavelength of the transmission light, and a good linear polarization state is maintained. In the case where the touch-panel equipped liquid crystal display apparatus of the present invention is realized with use of the above-described liquid crystal display apparatus, and where the polarization axial angle of the emission light having a wavelength of 550 nm, from the liquid crystal cell, is represented by α, and the slow axial angles of the ¼ wave plate B and ½ wave plate C are represented by β and γ, respectively, and in the case where the slow axis β within the film surface of the ¼ wave plate B is set at substantially 0° or 90° the arrangement should preferably be made such that the slow axial angle γ of the ½ wave plate C substantially satisfies the following equation:

$$\gamma=((45+90\times n)+\alpha)/2$$

(where α is 0 or positive number, and n is an integer of 0 or 1 to 3). In the case where the ¼ wave plates A and B are made of the same material, it is possible to prevent undesirable coloring of transmission light, which is caused by the measurement wavelength dependency of the retardation value dependency of the retardation value, with the above-described arrangement. Further, in the case where the second transparent conductive substrate 4 is an optically isotropic plastic film or sheet, which usually has a retardation as low as 5 to 20 nm as mentioned before, the arrangement of the ¼ retardation plate B should be set at 0° or 90°, that is, in parallel with or at right angles to the slow axis of the second transparent conductive substrate, in order to prevent the lowering of the yield of the second transparent conductive substrate without deteriorating the display characteristics. Similarly, in the case where a type in which a transparent conductive film is formed directly on the ¼ wave plate B is used as the second transparent conductive substrate, it is possible to prevent the lowering of the yield of the second transparent conductive substrate.

In the case where the slow axis β within the film surface of the ¼ wave plate B is not set at substantially 0° or 90° direction, the arrangement should preferably be made such that α, β and γ substantially satisfies the following equation:

$$\gamma=(\alpha+\beta\pm45)/2.$$

In particular, here, the absolute value of the difference between α and γ should be set in a range of 10° to 20°, so as to be able to prevent undesirable coloring of transmission light, which is caused by the measurement wavelength dependency of the retardation value between the ½ wave plate C and the ¼ wave plate B.

Figure 4:
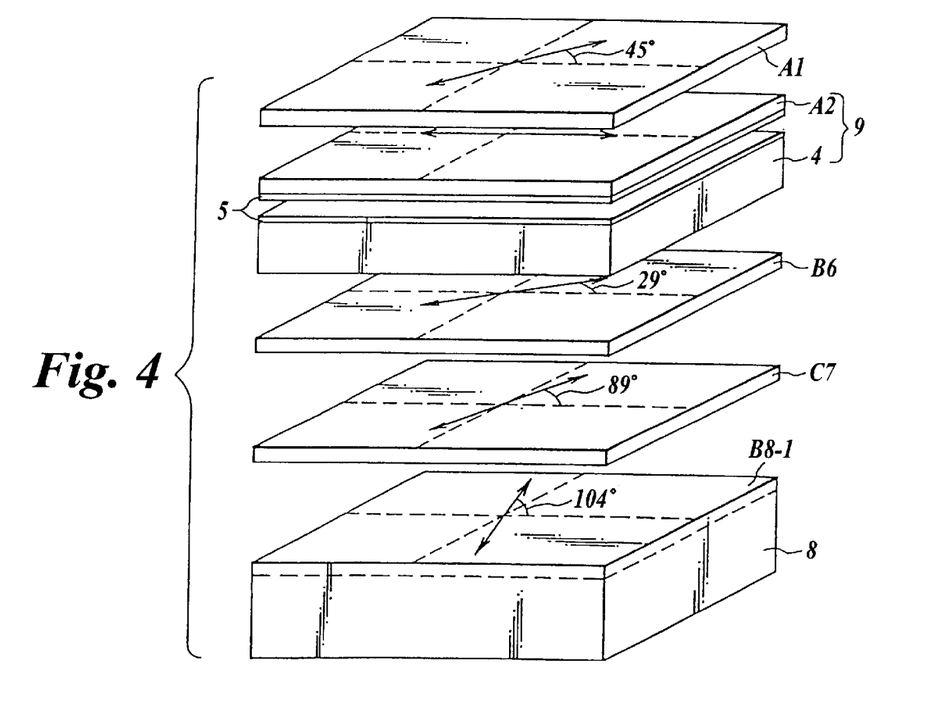
FIG. 4 is a view showing still another example of the touch-panel equipped liquid crystal display device according to the first aspect of the present invention.

The range of preferable angles is that of −20° to 20° with respect to the values given by the above equations, more preferably, that of −15° to 15° and further more preferably that of −10° to 10°. More specifically, in the case where the ¼ wave plates A and B are arranged in such a state that they cross over at right angles with the slow axis, and the polarization axis of the display surface side polarizing plate A is 45°, where n is 1 or 3, and the polarization axis is 135°, it is preferable that the ½ wave plate C should be arranged at an angle where n is 0 (which corresponds to the arrangement shown in FIG. 3) or 2. In the case where the slow axes of the ¼ wave plates A and B are arranged to be in parallel with each other, where the polarization axis of the display surface side polarizing plate A is 45°, n is 0 or 2, and where the polarization axis is 135°, it is particularly preferable that the ½ wave plate C should be arranged at an angle where n is 1 or 3. Further, as an example for the case where the slow axis β within the film surface of the ¼ wave plate B is not set at substantially 0° or 90° direction, in the case where the absolute value of the difference between α and γ for α=104° is set to 15°, γ=89° and β=29° (FIG. 4).

It is desirable that the ¼ wave plate B and the ½ wave plate C are adhered to the liquid crystal cell 8 underneath the touch panel; however they may be adhered to the lower-side second transparent conductive substrate 4 which constitutes the touch panel. Further, as already mentioned, in the case where the liquid crystal display apparatus has a retardation film for color compensation between the display surface side polarizing plate A and the liquid crystal cell, it is a preferable embodiment that the retardation film should be adhered to the lower-side second transparent conductive substrate 4 which constitutes the touch panel together with the ¼ wave plate B and the ½ wave plate C.

Further, the liquid crystal cell may include a new polarizing plate B8-1 which is separate from the polarizing plate A1, on the display surface side. In this case, the polarization axis of the emission light from the liquid crystal cell can be regarded as the polarization light axis of the polarizing plate B8-1, and a relative angle between the polarization axis of the polarizing plate B8-1 and the ½ wave plate C7 should preferably be an angle given by the equation.

When another ½ wave plate D having a retardation of ½ wavelength is arranged between the polarizing plate A1 and the ¼ wave plate A such that the ½ wave plate C and the slow axis cross over at right angles, the display quality can be improved. In this case, the preferable polarization light axial direction of the polarizing plate A is influenced, the arrangement should be optimized. In the case where the ½ wave plate D is arranged between the polarizing plate A and the ¼ wave plate A, and the polarization axis of the polarizing plate A and the slow axes of the ½ wave plate and ¼ wave plate A are represented by α', γ'and β' (where β'=0° or 90), the arrangement should preferably satisfy the relationship represented by the following equation, as in the above-described case:

γ=(α'+β'±45)/2.

Here, it is particularly preferable that the absolute value of the difference between α and γ should be selected from a range of 10° to 20°.

When the polarizing plates A and B used in the present invention are subjected to a reflection preventing process or an anti-glare process on their surfaces, the reflection of external light can be reduced, which is further preferable.

Further, in the liquid crystal display apparatus of the present invention, apart from the touch panel or wave plates of the present invention, some other structure having a well-known display quality improving function may be provided at an appropriate position between the display surface side polarizing plate A and the liquid crystal cell, for the purpose of improvement of the field view angle of the display image, and improvement of brightness.

For the liquid crystal display apparatus according to the second aspect of the present invention, a known liquid crystal display apparatus such as of a TN type or an STN type can be used.

As a wave plate usable for the present invention, a retardation film made of a known transparent plastic can be used. More specifically, plastic films of polycarbonate type, polyarylate type, polysulfone type, polyethersulfone type, poly (vinyl chloride) type, polyacrylonitryl type, polystylene type, polypropylene type, polyolefine type such as olefin-maleimide copolymer-based resin, polyvynil alcohol type, cellulose acetate type, substituted norbornene type, and the like, can be preferably used. Examples of particularly preferable materials are plastics of polycarbonate-based, polyester carbonate-based and polyarylate-based, which are made of bisphenol having an alkylidene group, such as bisphenol A as a bisphenol component, and bisphenol having a substituted or non-substituted cycloalkyldene. Further, polysulfone, polyethersulfone, norbornene-based resin disclosed in Jpn. Pat. Appln. KOKAI Publication No. 07-287122, and isobutylene-maleimide-based resin disclosed in Jpn. Pat. Appln. KOKAI Publication No. 05-59193, can be preferably used. Especially preferable films are of polyarylate, polycarbonate and polyestercarbonate, which contains a bisphenol component having a substituted or non-substituted cycloalkylidene group, an alkylidene group having 5 or more carbons or an aromatic group. More specifically, examples thereof are polycarbonates, polyarylate and polyester carbonate containing, as a bisphenol component, 1,1-bis(4-hydroxyphenyl)-cyclohexane, 1,1-bis(4-hydroxyphenyl)-3,3,5-trimethylcyclohexane, 3,3-bis(4-hydroxyphenyl)-pentane, 4,4-bis(4-hydroxyphenyl)-heptane, 1,1-bis(4-hydroxyphenyl)-1-phenylethane.

The wave plate used in the present invention is not limited to these plastics, but all of the known wave plates can be used. In general, the heat resistance of these plastics should preferably be 80° C. or higher in terms of glass transition temperature, more preferably be 120° C. or higher, and even further more preferably be 160° C. or more.

The film which constitutes the wave plate regarding the present invention can be made by a known film formation method such as a molten extrusion method or a solution flow casting method. The solution flow casting method is more preferable forming method since films having a smooth surface property, a small dispersion in thickness as well as in retardation. With the solution flow casting method, it is possible to obtain a film having a surface roughness (Ra value) of 100 nm or less, and a thickness dispersion of 5% or less of the average film thickness.

It is preferable, regarding the ¼ wave plates A and B of the present invention, that the retardation value (Re) expressed by (nx–ny)×d is ¼ wavelength with respect to visible light wavelength, where nx represents the refractive index within the film surface in the slow axial direction, ny represents the refractive index in a direction perpendicular to the slow axial direction, nz represents the refractive index in the film thickness direction, and d represents the thickness of the film, and the retardation values of both wave plates should substantially be the same. A preferable retardation value is 90 nm to 200 nm, and more preferably, 110 nm to 160 nm.

For the object of the present invention, each of the wave plates should preferably be ¼ wavelength over all wavelengths of visible light, and further it is preferable that a material with a retardation value of a wave plate, which has a small measurement wavelength dependency, should be selected. In particular, the material should preferably be of a type having a retardation with respect to light of a wavelength of 400 nm is 0.7 times or more but 1.2 times or less with respect to light of a wavelength of 550 nm. As preferable plastics, wave plates made of, other than polyvinyl alcohol or cellulose acetate, olefin-based plastics such as norbornene-based resin and isobutylene-maleimide-based resin, are preferable. Further, as can be seen in Jpn. Pat. Appln. KOKAI Publications No. 2-285304 and No. 10-90521, a lamination-type wave plate in which a plurality of retardation films are laminated such that the slow axes are displaced from each other, may be used.

Further, it is preferable that the retardations of these wavelength should be as constant as possible also with respect to light made incident at angle. It is preferable that wave plates which satisfy nz>ny, such as disclosed in Jpn. Pat. Appln. KOKAI Publications No. 2-160204, No. 4-230704 and No. 5-157911, should be used. In the wave plates which satisfy nz>ny, the preferable relationship among nx, ny and nz varies depending upon optical properties of each wave plate, and relative positions with regard to liquid crystal cell and touch panel, and therefore the relationship need be determined by experience.

The liquid crystal display apparatus according to the present invention has such a structure that a polarizing plate A11, a ¼ wave plate A12, a touch panel 19, a ¼ wave plate B16, and a liquid crystal cell 18 are disposed in the above-mentioned order from the display surface side, and the slow axis within the film surfaces of the ¼ wave plates A and B are set substantially not in parallel with each other or not cross over at right angles.

In the case of the STN liquid crystal display apparatus, the variation of the polarization state is complicated since it utilizes the birefringent effect. Generally, in the case of the STN liquid crystal display apparatus, a color compensation retardation film is used to control the polarization state. In the case of a liquid crystal display in which a color compensation retardation film is present on the display surface side of the liquid crystal cell, the liquid crystal cell of the present invention contains a color compensation retardation film. Therefore, the ¼ wave plates A and B and the touch panel are placed between the polarizing plate A and the color compensation retardation film.

With reference to drawings, the touch panel-equipped liquid crystal display apparatus according to the first aspect of the present invention will now be described in detail.

Figure 5:
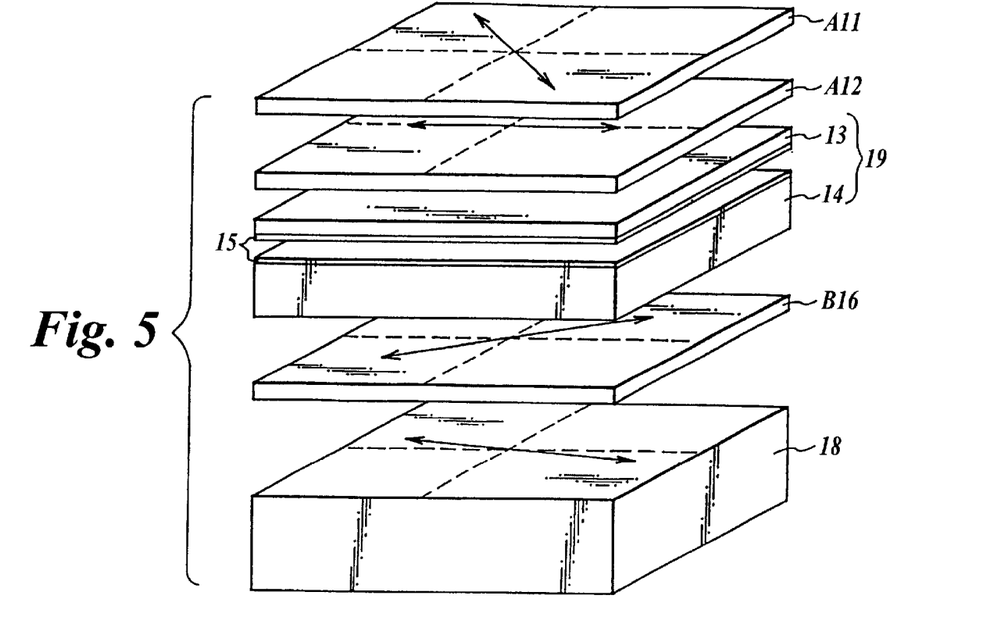
FIG. 5 is a view showing an example of the touch-panel equipped liquid crystal display device according to the second aspect of the present invention.

A specific embodiment of the present invention is shown in FIG. 5 together with the illustration of the arrangements of axes. From the display surface side, a polarizing plate A1, a ¼ wave plate A12, a touch panel 19, a ¼ wave plate B16 and a liquid crystal cell 18 are disposed in the above-mentioned order.

Figure 6:
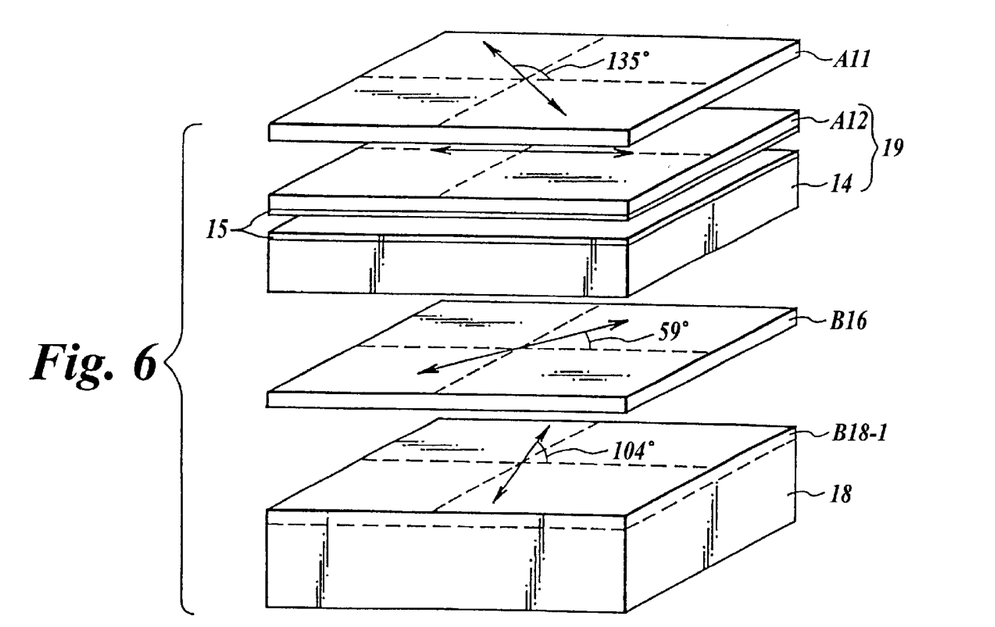
FIG. 6 is a view showing another example of the touch-panel equipped liquid crystal display device according to the second aspect of the present invention.

A resistance film type touch panel 19 of the present invention is a touch panel of a type in which two transparent conductive substrates on at least one surface of which a transparent conductive film is formed, are arranged such that the transparent conductive films face each other, and the transparent conductive substrate on the display surface side is pressed to bring the two conductive substrates into contact with each other, thus detecting the position. More specifically, the first transparent conductive substrate 13 and the second transparent conductive substrate 14 are formed as a combination such that the transparent conductive films 15 face each other. Spacers, electrodes and insulation resin and the like are formed on the two transparent conductive substrates 13 and 14 to have functions of touch panel. As the first transparent conductive substrate 13, a type which a transparent conductive layer is formed on an optically isotropic film can be used. Further, the first transparent conductive substrate 13 may be combined with the ¼ wave plate A, and as shown in FIG. 6, it is particularly preferable that the resultant of forming a transparent conductive film on the ¼ wave plate A, should be used as the first transparent conductive substrate. Here, the MD direction of the film can be made to match the display surface longitudinal side direction, and therefore the dispersion of the transparent conductive film resistance can be kept small, which is desirable. With such a structure, the film thickness on the touch panel display surface side (input surface side) can be reduced, thus making it possible to keep the pressure required for input by touch low. Thus, the input operation becomes easy, which is advantageous. The second transparent conductive substrate 14 is made of an optically isotropic material, generally, that in which a transparent conductive film is formed on a glass substrate, but it may be an optically isotropic plastic film or sheet. The second transparent conductive substrate 14 may be used while sticking it to the ¼ wave plate B, or of a type in which a transparent conductive film is formed directly on the ¼ wave plate B. The resistance values of these transparent conductive films should preferably be from 100 Ω/□ to 1000 Ω/□, more preferably 150 Ω/□ to 500 Ω/□.

In the case where the first transparent conductive substrate 13 or the second transparent conductive substrate 14 are formed of an optically isotropic plastic film or sheet, the film or sheet generally has a slight retardation of about 5 to 20 nm, and the slow axis is directed in the MD or TD direction. In such a case, the slow axis of the film or sheet is arranged to be in parallel with or at right angles to the slow axes of the ¼ wave plate A and the ¼ wave plate B, and in this manner, adverse effects on the display characteristics can be prevented.

The slow axis within the film surface of the ¼ wave plate A is set substantially in a direction of 0° or 90°, and it is set substantially at a diagonal position to the direction of the polarization axis of the display surface-side polarizing plate A. Further, a liquid crystal cell is optically designed so that the emission light from the liquid crystal cell (in the case where a retardation film for color compensation is present, the light is emitted via the retardation film) maintains a linear polarization state. In particular, the emission light from the liquid crystal cell to which a voltage is not applied does not depend very much on the wavelength of the transmission light, and a good linear polarization state is maintained. The ¼ wave plate B is arranged such that the slow axial axis within the film surface takes substantially a diagonal angle position with respect to the polarization axis or the elliptic major axis of the emission light from the liquid crystal cell (in the case where a retardation film for color compensation is present, the light is emitted via the retardation film). In the case where the major axial direction of the ellipse of the emission light from the liquid crystal cell somewhat varies depending upon the wavelength of the emission light as in the case of the STN liquid crystal cell, it must be determined by experience in such a range that the delay axis angle with respect to the ¼ wave plate B does not deviate very much from the diagonal position, while considering that the display quality of the touch-panel-equipped liquid crystal display apparatus is kept optimal. Further, it is necessary that the slow axes of the ¼ wave plates A and B are arranged at such positions that they do not run in parallel with each other or not cross over at right angles.

It is desirable that the ¼ wave plate B is adhered to the liquid crystal cell 18 underneath the touch panel; however it may be adhered to the lower-side second transparent conductive substrate 14 which constitutes the touch panel. Further, as already mentioned, in the case where the liquid crystal display apparatus has a retardation film for color compensation between the display surface side polarizing plate and the liquid crystal cell, it is a preferable embodiment that the retardation film should be adhered to the lower-side second transparent conductive substrate 14 which constitutes the touch panel together with the ¼ wave plate B.

Further, the liquid crystal cell may include a new polarizing plate B18-1 which is separate from the polarizing plate A11, on the display surface side. In this case, the polarization axis of the emission light from the liquid crystal cell can be regarded as the polarization light axis of the polarizing plate B18-1.

When the polarizing plates A and B used in the present invention are subjected to a reflection preventing process or an anti-glare process on their surfaces, the reflection of external light can be reduced, which is further preferable.

Further, in the liquid crystal display apparatus of the present invention, apart from the touch panel or wave plates of the present invention, some other structure having a well-known display quality improving function may be provided at an appropriate position between the display surface side polarizing plate A and the liquid crystal cell, for the purpose of improvement of the field view angle of the display image, and improvement of brightness.

EXAMPLES

Methods of measuring physical properties in values presented in Examples and Comparative Examples will be explained.

Retardation

With use of a microscopic polarization spectrophotometer made by Oak Manufacturer Inc., a sample was placed on a stage and the retardation was measured at a measurement wavelength of 550 nm.

The present invention will now be described in detail with reference to Examples.

Example 1

A roll-type retardation film (whose slow axis is in the MD direction of the film) having a thickness of 60 μm, a retardation of 140 nm and a width of 480 mm, made of polycarbonate [molecular weight of ηSP/C=0.85 (32° C., 0.32 g/dl in chloroform), a glass transition temperature of 206° C. (DSC)], consisting of 1,1-bis(4-hydroxyphenyl)-3, 3,5-trimethylcyclohexane, bisphenol A (molar ratio of 7:3) and phosgene, was used, and an epoxyacrylate-based ultraviolet curing coating solution in which a divinylbenzene-based filler having an average grain diameter of 2 μm is dispersed, was applied and cured, thus obtaining a hard-coat layer having a thickness of about 2 μm. On this surface, a transparent conductive film made of ITO was formed by a film roll-up type sputtering device, and thus a roll-type retardation film having a transparent conductive layer having a surface resistance of 4100 Ω/□. From the roll film, a size of about 7.5 inches (side: 150 mm, height: 110 mm) was cut out such that the display surface longitudinal direction was in the MD direction, thus obtaining a ¼ wave plate A having a slow axis directed in 0°. Here, four pieces could be cut out from the roll-type retardation film in the width direction, and the yield was 92%. Further, as the second transparent conductive substrate, a glass substrate having a transparent conductive layer having a surface resistance of 200 Ω/□, was used to assemble a transparent touch panel along with the ¼ wave plate A.

Further, as the ¼ wave plate B, a retardation film having a thickness of 75 μm, which is made of polycarbonate of bisphenol A was cut out from the roll-type film having a width of 480 mm such that the display surface longitudinal direction was set in the TD direction to cross over the ¼ wave plate A at right angles. Here, the yield was 94%.

Further, as the ½ wave plate C, a retardation film having a thickness of 58 μm and a retardation of 270 nm, which is made of polycarbonate as in the above case, was used.

In the meantime, as the liquid crystal display apparatus, a back-light equipped STN type liquid crystal display apparatus, having retardation films for color compensations on both surfaces of the liquid crystal cell, was used. The display surface-side polarizing plate was removed from the liquid crystal display apparatus, and the polarization light axis of the light emitted from the liquid crystal cell via the display surface side retardation film for color compensation was measured at various wavelengths. The results were 110° at a wavelength of 450 nm, 104° at a wavelength of 550 nm and 103° at a wavelength of 650 nm with use of this liquid crystal cell, a ½ wave plate was adhered on the display surface side retardation film for color compensation such as to direct the slow axis in a 74.5° direction, and further a ¼ wave plate B was adhered in lamination such as to direct the slow axis in a 90° direction. After that, a touch panel to which a polarizing plate A subjected to a surface reflection preventing process was adhered such as to direct the polarization light axis in a 135° direction, was put on the ¼ wave plate A via a spacer such that the display surface longitudinal directions thereof match, thus assembling a touch-panel equipped liquid crystal display apparatus. The axial direction of each structural element is shown in FIG. 3.

The liquid crystal display apparatus had an external light reflection rate of 1% or less, and exhibited a display image by no means inferior as compared to a display image before the touch panel was integrated.

Example 2

A touch panel-equipped liquid crystal was obtained in a similar manner to that of Example 1 except that a roll-type retardation film having a thickness of 75 μm and a retardation of 139 nm, which was made by a uniaxially expanded polyarylate film (glass transition temperature: 215° C.; A1F75 of Kanegafuchi Chemical Ind. Co., Ltd.) with one shaft, was used.

Example 3

A touch panel-equipped liquid crystal was obtained in a similar manner to that of Example 1 except that a roll-type retardation film having a thickness of 75 μm and a retardation of 139 nm, which was made by a uniaxially expanded polyarylate film (glass transition temperature: 190° C.; U-100 of Unitika Ltd.) with one shaft, was used.

Example 4

A touch panel-equipped liquid crystal was obtained in a similar manner to that of Example 1 except that a new ½ wave plate D having the same structure as that of the ½ wave plate C is disposed between the display surface side polarizing plate A and the ¼ wave plate A such that the slow axis cross over the ½ wave plate C at right angles, and the polarization light axis of the display surface side polarizing plate A was set to 14°. It exhibited a low external light reflection and a higher display image quality in terms of hue and contrast, as compared to that of Example 1.

Example 5

A touch panel-equipped liquid crystal was obtained in a similar manner to that of Example 1 except that a ¼ wave plate B and a ½ wave plate C were laminated in the above-mentioned order on the opposite side to the transparent conductive layer of the second transparent conductive substrate of the touch panel.

Comparative Example 1

In Example 1, the liquid crystal display apparatus with a touch panel integrated therewith without using a ½ wave plate had a similar external light reflection; however only a display image of a significantly lowered contrast could be obtained.

Example 6

A transparent conductive film was formed of a polynorbornene-based film containing an ester group (tradename: ARTON, Japan Synthetic Rubber Co., Ltd., retardation: 11 nm), in place of the polycarbonate used in Example 1, into the first transparent electrode substrate, and a touch panel was assembled by directing its optical axis in 0°. Polycarbonate retardation films made of bisphenol A having retardations of 131 nm, 141 nm and 270 nm were used as a ¼ wave plate A, a ¼ wave plate B and a ½ wave plate C.

In the meantime, as the liquid crystal display apparatus, a back-light equipped STN type liquid crystal display apparatus, having retardation films for color compensation on both surfaces of the liquid crystal cell, was used. The polarization light axis of the display surface side polarizing plate of this liquid crystal display apparatus was 14°. With use of the display surface side polarizing plate of the liquid crystal display apparatus as the polarizing plate B, a ½ wave plate C was adhered on the polarizing plate such as to direct the slow axis in a 74.5° direction, and further a ¼ wave plate B was adhered in lamination such as to direct the slow axis in a 90° direction. After that, a ¼ wave plate A was adhered to the display surface side (the first electrode substrate side)

of the touch panel such as to direct the slow axis at 0°, and further a touch panel to which a polarizing plate A subjected to a surface reflection preventing process was adhered such as to direct the polarization light axis in a 135° direction, was put thereon via a spacer such that the display surface longitudinal directions thereof match, thus assembling a touch-panel equipped liquid crystal display apparatus. The liquid crystal display apparatus had an external light reflection of 4% or less, and exhibited a display image by no means inferior as compared to a display image before the touch panel was integrated. The yield of the ¼ wave plate A and the transparent conductive film was 92% and the yield of the ¼ wave plate B was 94%.

Example 7

A transparent conductive film was formed of a polycarbonate-made optically isotropic film (retardation: 8 nm), used in Example 1, into the first transparent electrode substrate, and a touch panel was assembled by directing its optical axis in 0° Polycarbonate retardation films made of bisphenol A having retardations of 131 nm, 141 nm and 270 nm were used as a ¼ wave plate A, a ¼ wave plate B and a ½ wave plate C.

In the meantime, as the liquid crystal display apparatus, a back-light equipped STN type liquid crystal display apparatus, having retardation films for color compensation on both surfaces of the liquid crystal cell, was used. The polarization light axis of the display surface side polarizing plate of this liquid crystal display apparatus was 14°. With use of the display surface side polarizing plate of the liquid crystal display apparatus as the polarizing plate B, a ½ wave plate C was adhered on the polarizing plate B such as to direct the slow axis in a 74.5° direction, and further a ¼ wave plate B was adhered in lamination such as to direct the slow axis in a 90° direction. After that, a ¼ wave plate A was adhered to the display surface side (the first electrode substrate side) of the touch panel such as to direct the slow axis at 0°, and further a touch panel to which a polarizing plate A subjected to a surface reflection preventing process was adhered such as to direct the polarization light axis in a 135° direction, was put thereon via a spacer such that the display surface longitudinal directions thereof match, thus assembling a touch-panel equipped liquid crystal display apparatus. The liquid crystal display apparatus had an external light reflection of 4% or less, and exhibited a display image by no means inferior as compared to a display image before the touch panel was integrated.

Comparative Example 2

In Example 1, the ¼ wave plate B was adhered to the liquid crystal cell without using a ½ wave plate C such that the slow axis is set at 59° so that it would make an angle of 45° with respect to the polarization light axis of the emission light from the liquid crystal cell. Meanwhile, the slow axis was set at a 149° direction so that the ¼ wave plate A crosses over with the ¼ wave plate B at right angles, and thus the roll film was cut into touch panels. Since the slow axis is inclined, only 3 pieces could be cut out from the film width direction. The yield was very low as 53%, and the yield of the ¼ wave plate B was also 53%. Thus obtained touch panel-equipped liquid crystal display apparatus had optical characteristics similar to those of Example 1.

Example 8

As in Example 1, a touch panel-equipped liquid crystal display apparatus having such an axis arrangement as shown in FIG. 4 was assembled. The liquid crystal display apparatus had an external light reflection of 4% or less. Further, while keeping the yield of the ¼ wave plate from lowering substantially, a black display with less coloring as compared to the display image obtained in Example 1 was achieved, thus exhibiting an excellent display performance.

Comparative Example 3

With use of a norbornene-based film, ¼ wave plates A and B and a ½ wave plate, a touch panel-equipped liquid crystal display apparatus similar to that of Example 2 was assembled. Thus obtained touch panel-equipped liquid crystal display apparatus had optical characteristics similar to those of Example 1. The yield of the ¼ wave plate A or transparent conductive film was low as 53%, and the yield of the ¼ wave plate B was also 53%.

Example 9

A roll-type retardation film (whose slow axis is in the MD direction of the film) having a thickness of 60 μm, a retardation of 140 nm and a width of 480 mm, made of polycarbonate [molecular weight of ηSP/C=0.85 (32° C., 0.32 g/dl in chloroform), a glass transition temperature of 206° C. (DSC)], consisting of 1,1-bis(4-hydroxyphenyl)-3,3,5-trimethylcyclohexane, bisphenol A (molar ratio of 6:4) and phosgene, was used, and an epoxyacrylate-based ultra-violet curing coating solution in which a divinylbenzene-based filler having an average grain diameter of 2 μm is dispersed, was applied and cured, thus obtaining a hard-coat layer having a thickness of about 2 μm. On this surface, a transparent conductive film made of ITO was formed by a film roll-up type sputtering device, and thus a roll-type retardation film having a transparent conductive layer having a surface resistance of 400 Ω/□. From the roll film, a size of about 7.5 inches (side: 150 mm, height: 110 mm) was cut out such that the display surface longitudinal direction was in the MD direction, thus obtaining a ¼ wave plate A having a slow axis directed in 0°. Here, four pieces could be cut out from the roll-type retardation film in the width direction, and the yield was 92%. Further, as the second transparent conductive substrate, a glass substrate having a transparent conductive layer having a surface resistance of 200 Ω/□, was used to assemble a transparent touch panel along with the ¼ wave plate A.

Further, as the ¼ wave plate B, a retardation film having a thickness of 75 μm and a retardation of 141 nm, which was prepared by expanding a polycarbonate film uniaxially, was used.

In the meantime, as the liquid crystal display apparatus, a back-light equipped STN type liquid crystal display apparatus, having retardation films for color compensation on both surfaces of the liquid crystal cell, was used. The display surface-side polarizing plate was removed from the liquid crystal display apparatus, and the polarization light axis of the light emitted from the liquid crystal cell via the display surface side retardation film for color compensation was measured at various wavelengths. The results were 110° at a wavelength of 45° nm, 104° at a wavelength of 550 nm and 103° at a wavelength of 650 nm. With use of this liquid crystal cell, a ¼ wave plate B was adhered on the display surface side retardation film for color compensation such that the slow axis in a 59° direction so as to make an angle of 45° with respect to the polarization axis of the emission light of 550 nm. After that, a touch panel to which a polarizing plate A subjected to a surface reflection preventing process was adhered such as to direct the polarization light axis in a 135° direction, was put on the ¼ wave plate A via a spacer such that the display surface longitudinal directions thereof match, thus assembling a touch-panel equipped liquid crystal display apparatus. The axial direction of each structural element is shown in FIG. 6.

The liquid crystal display apparatus had an external light reflection rate of 1% or less and a contrast ratio of display image of 18, and exhibited a display image by no means inferior as compared to a display image before the touch panel was integrated.

Comparative Example 4

In Example 9, the liquid crystal display apparatus in which the touch panel was integrated such that the ¼ wave plate B and the ¼ plate A cross over at right angles had a similar external light reflection. However, only a display image with a contrast of the screen which was significantly lowered to 10 or less was obtained, and further the color balance of the image was markedly deteriorated.

Example 10

A touch panel-equipped liquid crystal was obtained in a similar manner to that of Example 9 except that a roll-type retardation film having a thickness of 75 μm and a retardation of 139 nm, which was made by a uniaxially expanded polyarylate film (glass transition temperature: 215° C.; A1F75 of Kanegafuchi Chemical Ind. Co., Ltd.) with one shaft, was used. Thus obtained liquid crystal display apparatus had similar performances as those of Example 9.

Example 11

A touch panel-equipped liquid crystal was obtained in a similar manner to that of Example 9 except that a roll-type retardation film having a thickness of 75 μm and a retardation of 139 nm, which was made by a uniaxially expanded polyarylate film (glass transition temperature: 190° C.; U-100 of Unitika Ltd.) with one shaft, was used. Thus obtained liquid crystal display apparatus had similar performances as those of Example 9.

Example 12

A touch panel-equipped liquid crystal was obtained in a similar manner to that of Example 9 except that a roll-type retardation film having a thickness of 85 μm and a retardation of 139 nm, which was made of a norbornene-based resin (tradename: ARTON, a product of Japan Synthetic Rubber Co., Ltd.), was used. The liquid crystal display apparatus had an external light reflection rate of 1% or less and a contrast of 19, and exhibited a display image by no means inferior as compared to a display image before the touch panel was integrated.

Example 13

A film having a transparent conductive layer was obtained in a similar manner to that of Example 9 except that an optically isotropic film having a thickness of 100 μm, which was made of a norbornene-based resin (tradename: ARTON, a product of Japan Synthetic Rubber Co., Ltd.), was used. With use of this film, a touch panel was assembled as in Example 9.

Further, as the ¼ wave plates A and B, films having a thickness of 75 μm and a retardation of 137 nm, which was prepared by expanding polycarbonate made of bisphenol A uniaxially, were used. The polarizing plate A, the ¼ wave plate A and the touch panel were adhered together in lamination in the mentioned order, to have the same axial arrangement as that of Example 9. Meanwhile, the ¼ wave plate B was laminated to the liquid crystal cell as in Example 9, and the lamination was adhered to the touch panel, thus obtaining a touch-panel liquid crystal display apparatus. Here, the contrast of the display image was 17, and the external light reflection was 1% or less.

Example 14

A touch panel-equipped liquid crystal was obtained in a similar manner to that of Example 9 except that the ¼ wave plate B is laminated on a opposite surface to the transparent conductive layer of the second transparent conductive substrate of the touch panel. The liquid crystal display apparatus had an external light reflection rate of 6% and a contrast of the display image of 19.

Example 15

As the ¼ wave plate A, a roll-type retardation film having a thickness of 75 μm and a retardation of 139 nm, which was made by a uniaxially expanded polyarylate film (glass transition temperature: 190° C.; U-100 of Unitika Ltd.) with one shaft, was used. Further, as the ¼ wave plate B, a retardation film having a thickness of 60 μm and a retardation of 139 nm, nx=1.5912, ny=1.5889 and nz=1.5899, which was prepared by expanding polycarbonate made of bisphenol A as a bisphenol component, was used. Thus, a touch panel was assembled as in Example 9. With use of this touch panel, a touch panel-equipped liquid crystal was obtained in a similar manner to that of Example 9. Thus obtained liquid crystal display apparatus had an external light reflection rate of 1% or less and a contrast ratio of display image of 18, and exhibited a display image by no means inferior as compared to a display image before the touch panel was integrated. If the touch panel-equipped liquid crystal display apparatus is viewed from an inclined direction, it did not exhibited a very significant decrease in contrast, and had a field view angle property similar to that of the display image before the touch panel was integrated.

Comparative Example 5

In Example 9, the ¼ wave plate B was adhered to the liquid crystal cell such that the slow axis is set at 59° so that it would make an angle of 45° with respect to the polarization light axis of the emission light from the liquid crystal cell. Meanwhile, the slow axis was set at a 149° direction so that the ¼ wave plate A crosses over with the ¼ wave plate B at right angles, and thus the roll film was cut into touch panels. Here, the polarization light axis direction of the polarizing plate on the display surface side was set to 104°. Since the slow axis is inclined, only 3 pieces could be cut out from the film width direction. The yield was very low as 53%. Thus obtained touch panel-equipped liquid crystal display apparatus had optical characteristics similar to those of Example 9.

Example 16

A transparent conductive film was formed of a polynorbornene-based film containing an ester group (tradename: ARTON, Japan Synthetic Rubber Co., Ltd., retardation: 11 nm), in place of the polycarbonate used in Example 9, into the first transparent electrode substrate, and a touch panel was assembled by directing its optical axis in 0°. Polycarbonate retardation films made of bisphenols A having retardations of 131 nm and 141 nm were used as a ¼ wave plate A and a ¼ wave plate B.

In the meantime, as the liquid crystal display apparatus, a back-light equipped STN type liquid crystal display apparatus, having color compensation retardation-films on both surfaces of the liquid crystal cell, was used. The polarization light axis of the display surface side polarizing plate of this liquid crystal display apparatus was 14°. With use of the display surface side polarizing plate of the liquid crystal display apparatus as the polarizing plate B, a ¼ wave plate B was adhered on the polarizing plate such as to direct the slow axis in a 149° (=−31°) direction. After that, a ¼ wave plate A was adhered to the display surface side (the first electrode substrate side) of the touch panel such as to direct the slow axis at 0°, and further a touch panel to which a polarizing plate A subjected to a surface reflection preventing process was adhered such as to direct the polarization light axis in a 135° direction, was put on the STN-type liquid crystal display apparatus via a spacer, thus assembling a touch-panel equipped liquid crystal display apparatus. The liquid crystal display apparatus had an external light reflection of 4% or less, and exhibited a display image by no means inferior as compared to a display image before the touch panel was integrated. The yield of the ¼ wave plate A and the transparent conductive film was 92% whereas the yield of the ¼ wave plate B was 53%.

Example 17

A transparent conductive film was formed of a polycarbonate-made optically isotropic film having a thickness of 75 μm and a retardation of 8 nm, used in Example 9. Further, the transparent conductive film is formed into the first transparent electrode substrate by directing its optical axis in 0°, and thus assembling a touch panel. Polycarbonate retardation films made of bisphenol A having retardations of 131 nm and 141 nm were used as a ¼ wave plate A and a ¼ wave plate B.

In the meantime, as the liquid crystal display apparatus, a liquid crystal display apparatus used in Example 9 was laminated on a color compensation retardation film such that the slow axis of the ¼ wave plate B was set in a 59° direction. In the meantime, a ¼ wave plate A was adhered to the display surface side (the first electrode substrate side) of the touch panel such as to direct the slow axis at 0° and further a touch panel to which a polarizing plate A subjected to a surface reflection preventing process was adhered such as to direct the polarization light axis in a 135° direction, was put on the STN type liquid crystal display cell via a spacer, thus assembling a touch-panel equipped liquid crystal display apparatus. The liquid crystal display apparatus had an external light reflection of 4% or less, and exhibited a display image by no means inferior as compared to a display image before the touch panel was integrated.

Comparative Example 6

With use of a norbornene-based film and ¼ wave plates A and B used in Example 16, a touch panel-equipped liquid crystal display apparatus similar to that of Comparative Example 5 was assembled. Thus obtained touch panel-equipped liquid crystal display apparatus had optical characteristics similar to those of Example 9. The yields of the ¼ wave plates A and B and the transparent conductive film were all as low as 53%.

Example 18

In place of the polycarbonate used in Example 9, a film made of alternating copolymerized material of isobutylene and maleimide (tradename: TI-60, Tosoh Corporation: thickness 90 μm, retardation: 140 nm), was used to form a transparent conductive film as in Example 9, which was made into the first transparent electrode substrate which also had a function of the ¼ wave plate A, and a touch panel was assembled by directing its optical axis in 0°. Further, a polycarbonate retardation film made of bisphenols A having a retardation of 141 nm was used as a ¼ wave plate B.

In the meantime, as the liquid crystal display apparatus, an STN type liquid crystal display apparatus, having a polarizing plate B used in Example 16 was used. The polarization light axis of the display surface side polarizing plate of this liquid crystal display apparatus was 14°. With use of the liquid crystal cell having the polarizing plate B, on the display surface side polarizing plate B, a ¼ wave plate B was adhered on the polarizing plate such as to direct the slow axis thereof in a 149° (=−31°) direction. After that, a ¼ wave plate A was adhered to the display surface side (the first electrode substrate side) of the touch panel such as to direct the slow axis at 0°, and further a touch panel to which a polarizing plate A subjected to a surface reflection preventing process was adhered such as to direct the polarization light axis in a 135° direction, was put on the STN-type liquid crystal display apparatus via a spacer, thus assembling a touch-panel equipped liquid crystal display apparatus. The liquid crystal display apparatus had an external light reflection of 4% or less, and exhibited a display image by no means inferior as compared to a display image before the touch panel was integrated. The yield of the ¼ wave plate A and the transparent conductive film was 92% whereas the yield of the ¼ wave plate B was 53%.

With the present invention, it is possible to provide a touch panel-equipped liquid crystal display apparatus having less internal reflection, at low cost. In particular, when the STN-type liquid crystal display apparatus is used as the liquid crystal display apparatus, the display apparatus, unlike the above-described TN-type liquid crystal display apparatus, does not have an emission light polarization axis from the liquid crystal cell directed in a particular angle, and therefore the effect of the present invention can be further markedly exhibited.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A touch-panel equipped liquid crystal display apparatus having a display surface comprising: a polarizing plate A; a ¼ wave plate a having a first film surface and a first slow axis within the first film surface; a touch panel; a ¼ wave plate B having a second film surface and a second slow axis within the second film surface; and a liquid crystal cell that emits a light having a polarization axis extending in a direction, all disposed in the aforementioned order from the display surface, wherein:

the first slow axis within the first film surface of the ¼ wave plate A is in a horizontal direction of 0° or in a vertical direction of 90° as viewed from the display surface;

the second slow axis within the second film surface of the ¼ wave plate B is substantially at a diagonal position to the direction in which the polarization axis of the light emitted from the liquid crystal cell extends; and the first slow axis of the ¼ wave plate A and the second slow axis of the ¼ wave plate B are nonparallel with each other without crossing at right angles.

2. A touch-panel equipped liquid crystal display apparatus according to claim 1, wherein, where a refractive index in the slow axis direction within the film surfaces of the ¼ wave plates A and B is represented by nx, a refractive index in a direction perpendicular to the slow axis is represented by ny, and a refractive index in a film thickness direction is represented by nz, at least one of the wave plates has a relationship nz>ny.

3. A touch panel-equipped liquid crystal display apparatus according to claim 1 or 2, wherein in that the liquid crystal cell is a super twist nematic-type liquid crystal cell.

4. A touch-panel equipped liquid crystal display apparatus according to claim 3, wherein the ¼ wave plate A serves also as a display surface side electrode substrate of the touch panel.

5. A touch-panel equipped liquid crystal display apparatus according to claim 2, wherein the ¼ wave plate A serves also as a display surface side electrode substrate of the touch panel.

6. A touch-panel equipped liquid crystal display apparatus according to claim 1, wherein the ¼ wave plate A serves also as a display surface side electrode substrate of the touch panel.

7. A touch-panel equipped liquid crystal display apparatus according to claim 1, wherein the liquid crystal cell further includes a new polarizing plate B on its display surface side, separately from the polarizing plate A.

8. A touch panel wherein the ¼ wave plates A and B and the touch panel according to claim 1, are laminated into an integral body, and the ¼ wave plate A is laminated on the display surface side of the touch panel, whereas the ¼ wave plate B is laminated on the opposite side surface of the touch panel.

9. A touch panel according to claim 8, wherein the ¼ wave plate A serves also as a display surface side electrode substrate of the touch panel.

* * * * *

UNITED STATES PATENT AND TRADEMARK OFFICE
CERTIFICATE OF CORRECTION

PATENT NO. : 6,611,299 B1
DATED : August 26, 2003
INVENTOR(S) : S. Fujii et al.

It is certified that error appears in the above-identified patent and that said Letters Patent is hereby corrected as shown below:

Title page, Item [54] and Column 1, lines 1-2,
Title, "LIQUID CYRSTAL DISPLAY APPARATUS WITH TOUCH-PANEL, AND TOUCH-PANEL" should read -- LIQUID CYRSTAL DISPLAY APPARATUS WITH TOUCH PANEL, AND TOUCH PANEL --

Title page,
Item [56], References Cited, U.S. PATENT DOCUMENTS, insert in appropriate order:

-- JP 11-134112   5/1999
   JP 5-59193     3/1993
   JP 7-287122    10/1995
   JP 2-285304    11/1990
   JP 5-100114    4/1993
   JP 10-68816    3/1998
   JP 2-160204    6/1990
   JP 4-230704    8/1992 --

FOREIGN PATENT DOCUMENTS, delete as duplicative "JP  10186136  7/1998" and insert in appropriate order -- JP  02019830  1/1990 --
OTHER PUBLICATIONS, insert in appropriate order:

-- OTHER PUBLICATIONS
Matsumoto, S. et al., "A Single-Cell High-Quality Black and White ST Liquid-Crystal Display," *Proceedings of the Society for Information Display* 30(2):111-115, New York, 1989. --

UNITED STATES PATENT AND TRADEMARK OFFICE
CERTIFICATE OF CORRECTION

PATENT NO.     : 6,611,299 B1
DATED          : August 26, 2003
INVENTOR(S)    : S. Fujii et al.

It is certified that error appears in the above-identified patent and that said Letters Patent is hereby corrected as shown below:

Column 20,
Line 53, "plate a" should read -- plate A --

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,611,299 B1
DATED         : August 26, 2003
INVENTOR(S)   : S. Fujii et al.

It is certified that error appears in the above-identified patent and that said Letters Patent is hereby corrected as shown below:

Column 21,
Line 12, after "wherein" delete "in that"

Signed and Sealed this

Twenty-first Day of September, 2004

JON W. DUDAS
*Director of the United States Patent and Trademark Office*